United States Patent
Melanson et al.

(10) Patent No.: US 9,240,725 B2
(45) Date of Patent: *Jan. 19, 2016

(54) COORDINATED DIMMER COMPATIBILITY FUNCTIONS

(71) Applicant: Cirrus Logic, Inc., Austin, TX (US)

(72) Inventors: John L. Melanson, Austin, TX (US); Eric J. King, Dripping Springs, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/102,809

(22) Filed: Dec. 11, 2013

(65) Prior Publication Data

US 2015/0162838 A1    Jun. 11, 2015

Related U.S. Application Data

(63) Continuation of application No. 13/194,808, filed on Jul. 29, 2011, now Pat. No. 8,610,364.

(60) Provisional application No. 61/369,202, filed on Jul. 30, 2010.

(51) Int. Cl.
  *G05F 1/00* (2006.01)
  *H02M 3/335* (2006.01)
  (Continued)

(52) U.S. Cl.
  CPC ............ *H02M 3/33507* (2013.01); *H02M 1/36* (2013.01); *H05B 33/0815* (2013.01); *H02M 2001/0006* (2013.01); *Y02B 20/346* (2013.01); *Y10T 307/352* (2015.04); *Y10T 307/50* (2015.04)

(58) Field of Classification Search
  CPC .......... H02M 1/36; H02M 2001/0006; H02M 3/33507; H05B 33/0815
  USPC ............ 315/194, 224, 291, DIG. 4, 307, 308; 323/212, 217, 218, 234, 235, 237, 239, 323/905
  See application file for complete search history.

(56) References Cited

U.S. PATENT DOCUMENTS

| 4,523,128 A | 6/1985 | Stamm et al. |
| 5,055,746 A | 10/1991 | Hu et al. |

(Continued)

FOREIGN PATENT DOCUMENTS

| CN | 1421986 A | 6/2003 |
| CN | 1459216 A | 11/2004 |

(Continued)

OTHER PUBLICATIONS

USPTO, Notice of Allowance in parent U.S. Appl. No. 13/194,808, filed Aug. 13, 2013, pp. 1-9.

(Continued)

*Primary Examiner* — Adolf Berhane
*Assistant Examiner* — Afework Demisse
(74) *Attorney, Agent, or Firm* — Terrile, Cannatti, Chambers & Holland, LLP; Kent B. Chambers (57) ABSTRACT

A system and method includes a controller that is configured to coordinate (i) a low impedance path for a dimmer current, (ii), control of switch mode power conversion and (iii) an inactive state to, for example, to allow a dimmer to function normally from cycle to cycle of an alternating current (AC) supply voltage. In at least one embodiment, the dimmer functions normally when the dimmer conducts at a correct phase angle indicated by a dimmer input setting and avoids prematurely resetting while conducting. In at least one embodiment, by coordinating functions (i), (ii), and (iii), the controller controls a power converter system that is compatible with a triac-based dimmer. In at least one embodiment, the controller coordinates functions (i), (ii), and (iii) in response to a particular dimming level indicated by a phase cut, rectified input voltage supplied to the power converter system.

20 Claims, 7 Drawing Sheets (51) Int. Cl.
*H02M 1/36* (2007.01)
*H05B 33/08* (2006.01)
*H02M 1/00* (2007.01)

(56) References Cited

U.S. PATENT DOCUMENTS

| | | | |
|---|---|---|---|
| 5,179,324 | A | 1/1993 | Audbert |
| 5,321,350 | A | 6/1994 | Haas |
| 5,604,411 | A | 2/1997 | Venkitasubrahmanian et al. |
| 5,629,607 | A * | 5/1997 | Callahan et al. ............... 323/237 |
| 5,661,645 | A | 8/1997 | Hochstein |
| 5,691,605 | A | 11/1997 | Xia et al. |
| 5,770,928 | A | 6/1998 | Chansky et al. |
| 6,043,635 | A | 3/2000 | Downey |
| 6,046,550 | A | 4/2000 | Ference et al. |
| 6,091,205 | A | 7/2000 | Newman et al. |
| 6,211,624 | B1 | 4/2001 | Holzer |
| 6,380,692 | B1 | 4/2002 | Newman et al. |
| 6,407,514 | B1 | 6/2002 | Glaser et al. |
| 6,510,995 | B2 | 1/2003 | Muthu et al. |
| 6,621,256 | B2 | 9/2003 | Muratov et al. |
| 7,184,937 | B1 | 2/2007 | Su et al. |
| 7,728,530 | B2 | 6/2010 | Wang et al. |
| 7,750,580 | B2 | 7/2010 | Lu et al. |
| 7,786,711 | B2 | 8/2010 | Wei et al. |
| 7,982,415 | B2 | 7/2011 | Kimura |
| 8,482,220 | B2 | 7/2013 | Melanson |
| 8,487,546 | B2 | 7/2013 | Melanson |
| 8,508,147 | B2 | 8/2013 | Shen |
| 8,536,794 | B2 | 9/2013 | Melanson et al. |
| 8,536,799 | B1 | 9/2013 | Grisamore et al. |
| 8,547,034 | B2 | 10/2013 | Melanson et al. |
| 8,569,972 | B2 | 10/2013 | Melanson |
| 8,610,364 | B2 | 12/2013 | Melanson et al. |
| 8,610,365 | B2 | 12/2013 | King et al. |
| 8,664,885 | B2 | 3/2014 | Koolen et al. |
| 8,716,957 | B2 | 5/2014 | Melanson et al. |
| 8,749,173 | B1 | 6/2014 | Melanson et al. |
| 8,847,515 | B2 | 9/2014 | King et al. |
| 2002/0140371 | A1 | 10/2002 | Chou et al. |
| 2006/0208669 | A1 | 9/2006 | Huynh et al. |
| 2008/0018261 | A1 | 1/2008 | Kastner |
| 2008/0101098 | A1 | 5/2008 | Disney |
| 2008/0143266 | A1 | 6/2008 | Langer |
| 2008/0192509 | A1 | 8/2008 | Dhuyvetter et al. |
| 2008/0203934 | A1 | 8/2008 | Van Meurs |
| 2009/0134817 | A1 | 5/2009 | Jurngwirth et al. |
| 2009/0135632 | A1 | 5/2009 | Sohma |
| 2010/0066328 | A1 | 3/2010 | Shimizu et al. |
| 2010/0213859 | A1 | 8/2010 | Shteynberg |
| 2010/0231136 | A1 | 9/2010 | Reisenbauer et al. |
| 2011/0080110 | A1 | 4/2011 | Nuhfer et al. |
| 2011/0084622 | A1 | 4/2011 | Barrow et al. |
| 2011/0084623 | A1 | 4/2011 | Barrow |
| 2011/0115395 | A1 | 5/2011 | Barrow et al. |
| 2011/0148318 | A1 | 6/2011 | Shackle et al. |
| 2011/0204797 | A1 | 8/2011 | Lin et al. |
| 2011/0204803 | A1 | 8/2011 | Grotkowski et al. |
| 2011/0234115 | A1 | 9/2011 | Shimizu et al. |
| 2011/0291583 | A1 | 12/2011 | Shen |
| 2011/0309759 | A1 | 12/2011 | Shteynberg et al. |
| 2011/0316441 | A1 | 12/2011 | Huynh |
| 2012/0049752 | A1* | 3/2012 | King ................. H05B 33/0815 315/210 |
| 2012/0068626 | A1 | 3/2012 | Lekatsas et al. |
| 2012/0098454 | A1 | 4/2012 | Grotkowski et al. |
| 2012/0112651 | A1 | 5/2012 | King et al. |
| 2012/0133291 | A1 | 5/2012 | Kitagawa et al. |
| 2012/0286686 | A1 | 11/2012 | Watanabe et al. |
| 2013/0015768 | A1 | 1/2013 | Roberts et al. |
| 2013/0154495 | A1 | 6/2013 | He |
| 2013/0193879 | A1 | 8/2013 | Sadwick et al. |
| 2014/0009082 | A1 | 1/2014 | King et al. |

FOREIGN PATENT DOCUMENTS

| | | |
|---|---|---|
| CN | 1748446 A | 3/2006 |
| CN | 1843061 A1 | 10/2006 |
| CN | 101164383 A | 4/2008 |
| CN | 101505568 A | 8/2009 |
| CN | 101707874 A | 5/2010 |
| CN | 101835314 | 9/2010 |
| CN | 101926222 | 12/2010 |
| JP | 2009170240 A | 7/2009 |
| WO | 9917591 | 4/1999 |
| WO | 2008112822 A2 | 9/2008 |
| WO | 2011050453 A1 | 5/2011 |
| WO | 2011056068 A2 | 5/2011 |
| WO | 2012016197 A1 | 2/2012 |
| WO | 2010027493 A2 | 3/2012 |

OTHER PUBLICATIONS

Applicants, Response to Non-Final USPTO Office Action in parent U.S. Appl. No. 13/194,808, filed Jul. 26, 2013, pp. 1-12.

USPTO, Non-Final Rejection in parent U.S. Appl. No. 13/194,808, filed Apr. 26, 2013, pp. 1-6.

Supertex, Inc., HV9931 Unity Power Factor LED Lamp Driver, pp. 1-7, 2005, Sunnyvale, California, USA.

Wang Xiao, Phase Control Dimming of the Dimmable Lighting System, Journal of Wuxi University of Light Industry, Jul. 31, 2000, vol. 19, No. 4, pp. 1-3. The Abstract contains a concise explanation in English, and the Search Report identifies the following portions as related to the claims in the Present Application: p. 408, right-hand column, section 2, and figures 5-7.

Search Report, Chinese Patent Application No. 2011800376688, The State Intellectual Property Office of the People's Republic of China, Dec. 9, 2014, pp. 1-2.

Amanci, et al, "Synchronization System with Zero-Crossing Peak Detection Algorithm for Power System Applications", The 2010 International Power Electronics Conference, pp. 2984-2991, Toronto, Ontario, Canada.

Patterson, James, "Efficient Method for Interfacing Triac Dimmers and LEDs", National Semiconductor Corp., pp. 29-32, Jun. 23, 2011, USA.

Vainio, Olli, "Digital Filtering for Robust 50/60 Hz Zero-Crossing Detectors", IEEE Transactions on Instrumentation and Measurement, vol. 45, No. 2, pp. 426-430, Apr. 1996, University of Santa Barbara, California, USA.

First Office Action, Chinese Patent Application No. 2011800376688, The State Intellectual Property Office of the People's Republic of China, Jan. 16, 2015, pp. 1-7.

Response to the Written Opinion as filed on Jan. 3, 2014, Application No. 11748799.1, European Patent Office, pp. 1-21.

First Office Action dated May 22, 2015, mailed in Application No. 11748799.1, European Patent Office, pp. 1-8.

Second Office Action dated Sep. 29, 2015, Application No. 2011800376688, The State Intellectual Property Office of China, pp. 1-4.

* cited by examiner

COORDINATED DIMMER COMPATIBILITY FUNCTIONS

CROSS-REFERENCE TO RELATED APPLICATION

This application claims the benefit under 35 U.S.C. §119 (e) and 37 C.F.R. §1.78 of U.S. Provisional Application No. 61/369,202, filed Jul. 30, 2010, and entitled "LED Lighting Methods and Apparatuses" and is incorporated by reference in its entirety.

BACKGROUND OF THE INVENTION

1. Field of the Invention

The present invention relates in general to the field of electronics, and more specifically to a method and system for coordinating dimmer compatibility functions.

2. Description of the Related Art

Electronic systems utilize dimmers to modify output power delivered to a load. For example, in a lighting system, dimmers provide an input signal to a lighting system, and the load includes one or more light sources such as one or more light emitting diodes (LEDs) or one or more fluorescent light sources. Dimmers can also be used to modify power delivered to other types of loads, such as one or more motors or one or more portable power sources. The input signal represents a dimming level that causes the lighting system to adjust power delivered to a lamp, and, thus, depending on the dimming level, increase or decrease the brightness of the lamp. Many different types of dimmers exist. In general, dimmers use a digital or analog coded dimming signal that indicates a desired dimming level. For example, some analog based dimmers utilize a triode for alternating current ("triac") device to modulate a phase angle of each cycle of an alternating current ("AC") supply voltage. "Modulating the phase angle" of the supply voltage is also commonly referred to as "chopping" or "phase cutting" the supply voltage. Phase cutting the supply voltage causes the voltage supplied to a lighting system to rapidly turn "ON" and "OFF" thereby controlling the average power delivered to the lighting system.

Figure 1:
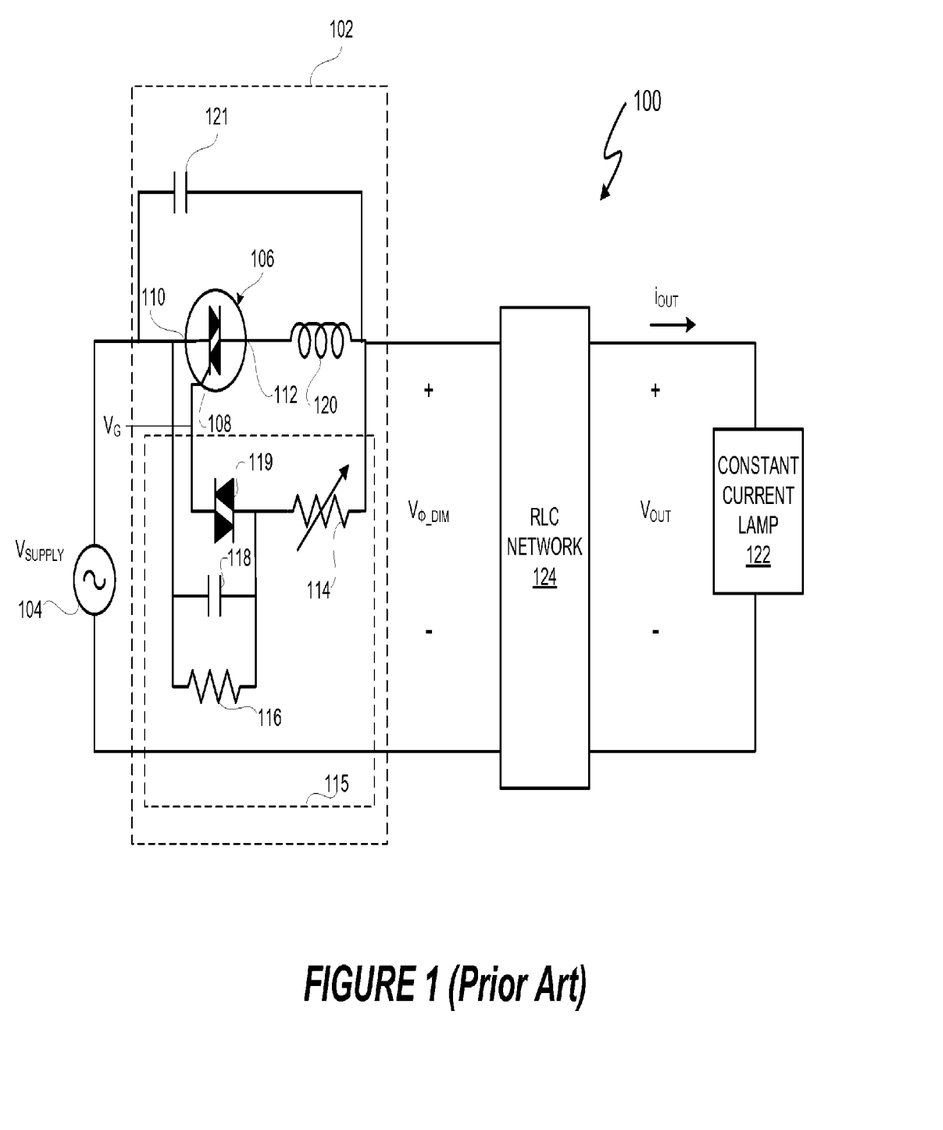
FIG. 1 (labeled prior art) depicts a lighting system that includes a leading edge dimmer.
Figure 2:
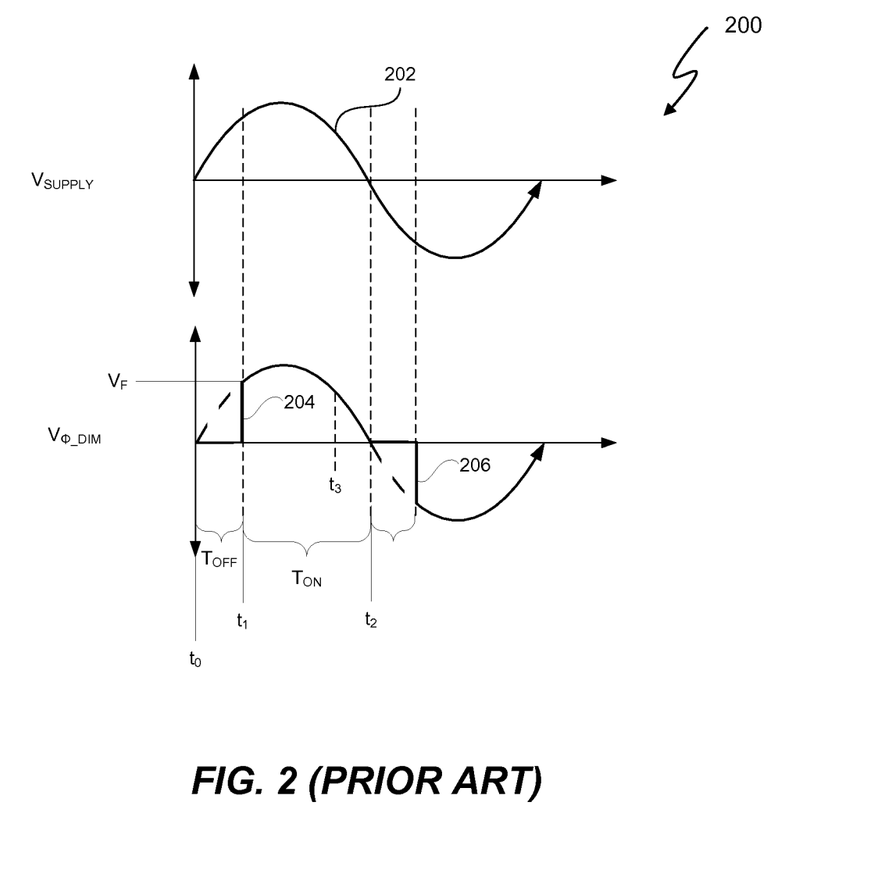
FIG. 2 (labeled prior art) depicts exemplary voltage graphs associated with the lighting system of FIG. 1.

FIG. 1 depicts a lighting system 100 that includes a leading edge dimmer 102. FIG. 2 depicts exemplary voltage graphs 200 associated with the lighting system 100. Referring to FIGS. 1 and 2, the lighting system 100 receives an AC supply voltage $V_{SUPPLY}$ from voltage supply 104. The supply voltage $V_{SUPPLY}$, indicated by voltage waveform 202, is, for example, a nominally 60 Hz/110 V line voltage in the United States of America or a nominally 50 Hz/220 V line voltage in Europe. A leading edge dimmer phase cuts leading edges, such as leading edges 204 and 206, of each half cycle of supply voltage $V_{SUPPLY}$. Since each half cycle of supply voltage $V_{SUPPLY}$ is 180 degrees of the supply voltage $V_{SUPPLY}$, a leading edge dimmer phase cuts the supply voltage $V_{SUPPLY}$ at an angle greater than 0 degrees and less than 180 degrees. Generally, the voltage phase cutting range of a leading edge dimmer 102 is 10 degrees to 170 degrees. The leading edge dimmer 102 can be any type of leading edge dimmer such as a triac-based leading edge dimmer available from Lutron Electronics, Inc. of Coopersberg, Pa. ("Lutron"). A triac-based leading edge dimmer is described in the Background section of U.S. patent application Ser. No. 12/858,164, entitled Dimmer Output Emulation, filed on Aug. 17, 2010, and inventor John L. Melanson.

Ideally, by modulating the phase angle of the dimmer output voltage $V_{\phi\_DIM}$, the leading edge dimmer 102 effectively turns the constant current lamp 122 OFF during time period $T_{OFF}$ and ON during time period $T_{ON}$ for each half cycle of the supply voltage $V_{SUPPLY}$. Thus, ideally, the dimmer 102 effectively controls the average power supplied to the constant current lamp 122 in accordance with the dimmer output voltage $V_{\phi\_DIM}$. However, in many circumstances, the leading edge dimmer 102 does not operate ideally. For example, when the constant current lamp 122 draws a small amount of current $i_{DIM}$, the current $i_{DIM}$ can prematurely drop below a holding current value HC before the supply voltage $V_{SUPPLY}$ reaches approximately zero volts. When the current $i_{DIM}$ prematurely drops below the holding current value HC, a triac-based leading edge dimmer 102 prematurely resets, i.e. prematurely disengages (i.e. turns OFF and stops conducting), and the dimmer voltage $V_{\phi\_DIM}$ will prematurely drop to zero. An exemplary premature reset would occur if the dimmer 102 reset at time $t_3$ and the dimmer voltage $V_{\phi\_DIM}$ dropped to 0V at time $t_3$. When the dimmer voltage $V_{\phi\_DIM}$ prematurely drops to zero, the dimmer voltage $V_{\phi\_DIM}$ does not reflect the intended dimming value as set by the resistance value of variable resistor 114. The diode for alternating current ("diac") 119, capacitor 118, resistor 116, and variable resistor 114 form a timing circuit 116 that resets triac 106. Additionally, the triac 106 of leading edge dimmer 102 can reset and then conduct repeatedly, i.e. disengage (non-conductive), reengage (conductive), disengage (non-conductive), and so on repeatedly during a half-cycle of supply voltage $V_{SUPPLY}$ when the current $i_{DIM}$ is below or near the holding current value HC. A "reset-conduct" sequence occurs when the dimmer 102 resets and then conducts the supply voltage $V_{SUPPLY}$ one or more times during a single half-cycle of the supply voltage $V_{SUPPLY}$.

The lighting system 100 includes a resistor, inductor, capacitor (RLC) network 124 to convert the dimmer voltage $V_{\phi\_DIM}$ to an approximately constant voltage and, thus, provide an approximately constant current $i_{OUT}$ to the constant current lamp 122 for a given dimmer phase angle. Although relatively simply to implement, the RLC network 124 is inefficient because of, for example, resistor-based power losses. Additionally, reactive load presented by the RLC network 124 to the dimmer 102 can cause the triac to malfunction.

SUMMARY OF THE INVENTION

In at least one embodiment, a dimmer voltage to a power converter system includes three states that occur from:
- A. an approximately zero volt crossing of the dimmer voltage of a dimmer until a phase cut, leading edge of the dimmer voltage;
- B. an end of state A until energy transferred to a load is sufficient to meet at least one energy transfer parameter; and
- C. an end of state B until a beginning of state A.

In one embodiment of the present invention, an apparatus comprises a controller. The controller is configured to:
for state A, enable a low impedance path for a dimmer current of the dimmer, wherein the impedance of the low impedance path is sufficiently low to maintain a stable phase angle of the dimmer;
for state B,
enable control of switch mode power conversion of the dimmer voltage; and
control the switch mode power conversion to maintain the dimmer current above a current threshold; and
for state C, enter an inactive state, wherein during the inactive state the low impedance path and the control of mode power conversion is disabled.

In another embodiment of the invention, a method includes:

for state A, enabling a low impedance path for a dimmer current of the dimmer, wherein the impedance of the low impedance path is sufficiently low to maintain a stable phase angle of the dimmer;

for state B:
  enabling control of switch mode power conversion of the dimmer voltage; and
  controlling switch mode power conversion to maintain the dimmer current above a threshold; and for state C, entering an inactive state, wherein during the inactive state the low impedance path and the control of mode power conversion is disabled.

In a further embodiment of the present invention, an apparatus comprises:

for state A, means for enabling a low impedance path for a dimmer current of the dimmer, wherein the impedance of the low impedance path is sufficiently low to maintain a stable phase angle of the dimmer;

for state B:
  means for enabling control of switch mode power conversion of the dimmer voltage; and
  means for controlling switch mode power conversion to maintain the dimmer current above a threshold; and for state C, means for entering an inactive state, wherein during the inactive state the low impedance path and the control of mode power conversion is disabled.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In at least one embodiment, a system and method includes a controller that is configured to coordinate (i) a low impedance path for a dimmer current, (ii) control of switch mode power conversion and (iii) an inactive state to, for example, reduce the dimmer current while allowing a dimmer to function normally from cycle to cycle of an alternating current (AC) supply voltage. In at least one embodiment, the dimmer functions normally when the dimmer conducts at a correct phase angle indicated by a dimmer input setting and avoids prematurely resetting while conducting. In at least one embodiment, by coordinating functions (i), (ii), and (iii), the controller controls a power converter system that is compatible with a triac-based dimmer. In at least one embodiment, the controller coordinates functions (i), (ii), and (iii) in response to a particular dimming level indicated by a phase cut, rectified input voltage supplied to the power converter system. In at least one embodiment, as the dimming level changes, the controller adjusts coordination of functions (i), (ii), and (iii) so that the power converter system provides a constant current to the load for each dimming level. In at least one embodiment, the system operating under control of the controller reduces resistor-based power losses while providing compatibility between the triac-based dimmer and a load receiving a constant current for a dimming level.

In at least one embodiment, a dimmer generates a voltage that is rectified and provided to the power converter system as a dimmer output voltage. The dimmer output voltage includes three states. In at least one embodiment, the three states are sequential and non-overlapping and, i.e. the three states occur one after another and do not overlap in time. In at least one embodiment, the dimmer output voltage to the power converter system includes three states that occur from:

A. an approximately zero volt crossing of the dimmer output voltage of the dimmer until a phase cut, leading edge of the dimmer output voltage;

B. an end of state A until energy transferred to a load is sufficient to meet at least one energy transfer parameter; and C. an end of state B until a beginning of state A;

Other embodiments of the dimmer output voltage can have, for example, additional states. The states in A, B, and C can be sub-divided into sub-states.

Given the three foregoing states, in at least one embodiment, the controller of the electronic system is configured to coordinate functions (i), (ii), and (iii) as follows:

for state A, enable a low impedance path for a dimmer current of the dimmer, wherein the impedance of the low impedance path is sufficiently low to maintain a stable phase angle of the dimmer;

for state B, enable control of switch mode power conversion of the dimmer output voltage, wherein the control of mode power conversion maintains the dimmer current above a threshold; and for state C, enter an inactive state, wherein during the inactive state the low impedance path and the control of mode power conversion is disabled.

Figure 3:
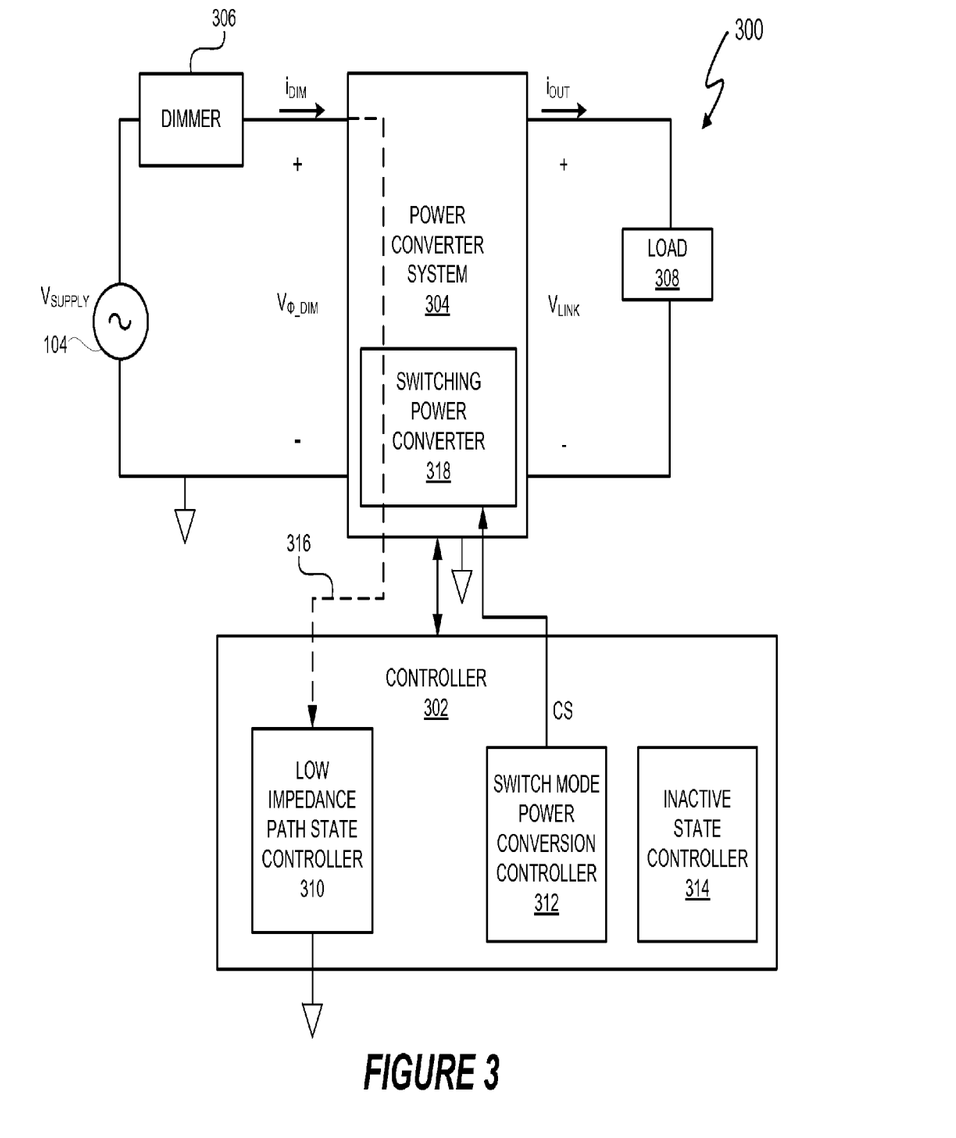
FIG. 3 depicts an electronic system that includes a controller to control a power converter system by coordinating the functions of a glue circuit, a dimmer emulator, and a switch mode power conversion controller.

FIG. 3 depicts an electronic system 300 that includes a controller 302 to control power converter system 304 by, for example, coordinating the functions of low impedance path state controller 310, and a switch mode power conversion controller 312, and inactive state controller 314 to provide compatibility between the dimmer 306 and the load 308 so that, for example, the dimmer 306 functions normally. In at least one embodiment, the power converter system 304 includes a switching power converter 318 that converts a dimmer voltage $V_{\phi\_DIM}$ from dimmer 306 into a regulated output voltage $V_{LINK}$. The power converter system 304 also provides a current $i_{OUT}$ for a load 308. The load 308 can be any load including a lamp that includes one or more light emitting diodes (LEDs). In at least one embodiment, the current $i_{OUT}$ is an approximately constant current for a dimming level of the dimmer 306. An "approximately constant current for a dimming level" means that for a particular dimming level, the current $i_{OUT}$ will have an approximately constant value. Dimmer 306 can be any type of dimmer, such as a triac-based dimmer identical to dimmer 102 of FIG. 1. In at least one embodiment, dimmer 306 is a "smart dimmer" that includes a triac-based, supply voltage phase cutting circuit.

"Smart dimmers" refer to a class of dimmers that include a microprocessor to control various functions such as setting the dimmer level.

In at least one embodiment, the controller 302 supports a normal operation of the dimmer 306 by restraining the dimmer 306 from prematurely resetting and supporting a stable phase angle cut for a given dimming level to prevent phase cutting at a wrong phase angle for a set dimming level. In at least one embodiment, the controller 302 also provides a constant output current $i_{OUT}$ corresponding to a dimmer level set by dimmer 306. A "wrong" phase angle is, for example, a phase angle that differs from a phase angle set by the timer 115, which can occur if, for example, capacitor 121 (FIG. 1) prematurely discharges. For loads, such as one or more light emitting diodes, that utilize a small output current $i_{OUT}$, especially at low dimming levels, the output current $i_{OUT}$ utilized by the loads can be insufficient to support a normal operation of a triac-based dimmer 306.

In at least one embodiment, the controller 302 enables the low impedance path state controller 310 to provide a low impedance current path 316 to the dimmer 306 from an approximately zero volt crossing of the dimmer voltage $V_{\phi\_DIM}$ of the dimmer 306 until a phase cut, leading edge of the dimmer voltage $V_{\phi\_R}$. As subsequently described with reference to FIG. 6, the zero crossing of the dimmer voltage $V_{\phi\_R}$ occurs at an end of each cycle of the dimmer voltage $V_{\phi\_R}$ when the dimmer voltage $V_{\phi\_R}$ approximately reaches 0V. In at least one embodiment, the dimmer voltage $V_{\phi\_R}$ approximately reaches 0V when the dimmer voltage $V_{\phi\_R}$ has a voltage value less than or equal to 0+a zero crossing voltage threshold $V_{ZC\_TH}$. The particular value of the zero crossing voltage threshold is a matter of design choice and, in at least one embodiment, is 5V. The particular impedance value of current path 316 is a matter of design choice. In at least one embodiment, the impedance value of current path 316 is sufficiently low to allow a sufficient dimmer current $i_{DIM}$ to flow through dimmer 306 to provide a stable phase angle for dimmer 306, i.e. prevent the dimmer 306 from firing at the wrong phase angle. In at least one embodiment, enabling the low impedance path 316 at the zero crossing of the dimmer voltage $V_{\phi\_R}$ supports consistent timing for the phase angle cutting by the dimmer 306 for a given dimming level. Thus, the phase angle cut by the dimmer 306 for a given dimming level remains consistent. In at least one embodiment, providing the low impedance current path 316 to dimmer 306 prevents the dimmer current $i_{DIM}$ from decreasing below a holding current (HC) value of a triac-based dimmer 306.

At an end of the phase cut of supply voltage $V_{SUPPLY}$, controller 302 disables the glue circuit 302, and the glue circuit 302 releases the low impedance current path 316, i.e. low impedance current path 316 is disabled or placed in a high impedance state to substantially prevent current flow through current path 316. At the end of the phase cut, controller 302 enables the switch mode power conversion controller, and the switch mode power conversion controller 312 generates a control signal CS to control power conversion by the power converter system 304. In at least one embodiment, the controller 302 senses the link voltage $V_{LINK}$, and, when the link voltage $V_{LINK}$ is greater than a link voltage threshold value, the controller 302 disables the switch mode power conversion controller 312. The particular value of the link voltage threshold is a matter of design choice. In at least one embodiment, the link voltage threshold value is set so that the link voltage $V_{LINK}$ can be maintained at an approximately DC value. In at least one embodiment, the switch mode power conversion controller 312 maintains the dimmer current $i_{DIM}$ at a level so that the dimmer 306 remains in a conductive state from an occurrence of a phase cut, leading edge of the dimmer voltage $V_{\phi\_R}$ until energy transferred to the load 308 is sufficient to meet at least one energy transfer parameter, such as the link voltage $V_{LINK}$ is above a target link voltage $V_{LINK\_TARGET}$ and dimmer 306 has been in a conductive state until a zero crossing of the supply voltage $V_{SUPPLY}$ so that the dimmer 306 does not prematurely reset. A premature reset can also cause instability in phase cutting by dimmer 306 and, thus, cause the dimmer 306 to cut the supply voltage $V_{SUPPLY}$ at a wrong phase angle.

In at least one embodiment, when the controller 302 disables the switch mode power conversion controller 312, the controller 302 enables the inactive state controller 314. In at least one embodiment, the inactive state controller 314 causes the dimmer current $i_{DIM}$ to drop to approximately 0A and determines a zero crossing of the dimmer voltage $V_{\phi\_R}$. In at least one embodiment, the inactive state controller 314 determines the zero crossing so that the low impedance path state controller 310 can enable the low impedance path 316 at the zero crossing and support stable phase cutting angles by the dimmer 306 so that the dimmer 306 remains stable for a given dimming level. In at least one embodiment, the inactive state controller 314 generates an emulated dimmer voltage $V_{\phi\_IM}$ to, for example, determine a zero crossing of the dimmer voltage $V_{\phi\_R}$. In at least one embodiment, the inactive state controller 314 generates the emulated dimmer voltage by enabling the current path 316 to discharge a current that is inversely proportional to the dimmer voltage $V_{\phi\_DIM}$. In at least one embodiment, the inactive state controller 314 shapes the discharged current so that the emulated dimmer voltage approximates an actual dimmer voltage $V_{\phi\_DIM}$. The term "determine" and derivatives thereof contemplates analytical determination, detection by observation, or a combination of analytical determination and detection by observation.

Figure 4:
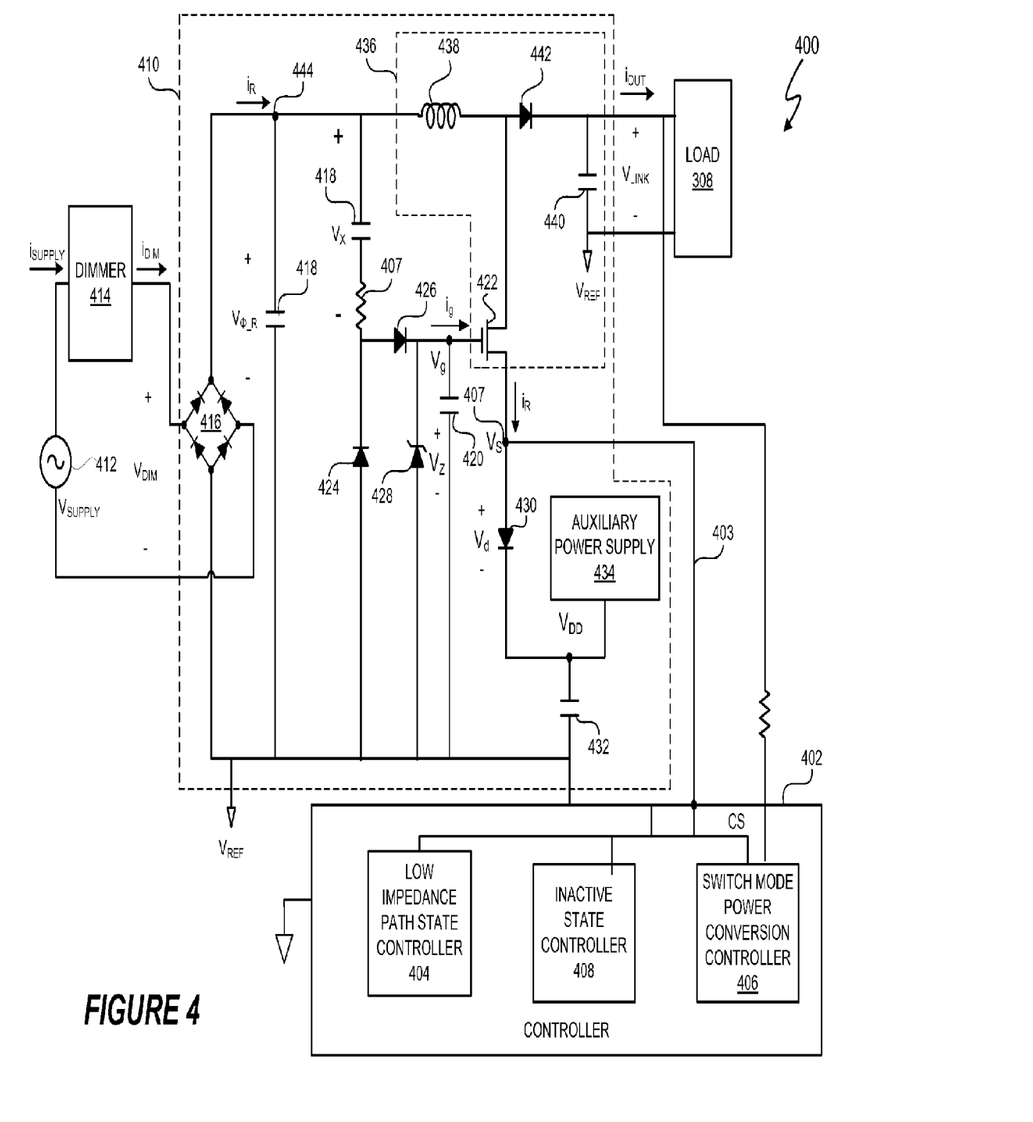
FIG. 4 depicts an electronic system that represents one embodiment of the electronic system of FIG. 3.

FIG. 4 depicts an electronic system 400, which represents one embodiment of electronic system 300. Electronic system 400 includes controller 402, and controller 402 includes low impedance path state controller 404, switch mode power conversion controller 406, and inactive state controller 408. The controller 402 coordinates the low impedance path state controller 404, switch mode power conversion controller 406, and inactive state controller 408. Controller 402 represents one embodiment of the controller 302. The low impedance path state controller 404 represents one embodiment of the low impedance path state controller 310. The switch mode power conversion controller 406 represents one embodiment of the switch mode power conversion controller 312, and the inactive state controller 408 represents one embodiment of the inactive state controller 314.

Electronic system 400 includes a power converter system 410 to convert the dimmer voltage $V_{\phi\_DIM}$ into a regulated, approximately DC output voltage $V_{LINK}$ for load 308. Voltage source 412 supplies an alternating current (AC) input voltage $V_{SUPPLY}$ through the series connected, triac-based dimmer 414 to a full bridge diode rectifier 416. In at least one embodiment, dimmer 414 is identical to dimmer 306 (FIG. 3). The voltage source 412 is, for example, a public utility, and the AC supply voltage $V_{SUPPLY}$ is, for example, a 60 Hz/110 V line voltage in the United States of America or a 50 Hz/220 V line voltage in Europe. The dimmer 414 provides a dimmer voltage $V_{DIM}$. In at least one embodiment, the dimmer 414 is a leading edge dimmer, and the dimmer voltage $V_{\phi\_DIM}$ has a leading phase cut when the dimmer 414 generates a dimming level between approximately 0 and 100%. The full bridge rectifier 416 supplies a rectified AC dimmer voltage $V_{\phi\_R}$ to the power converter system 410. Thus, the dimmer voltage $V_{\phi\_R}$ represents a rectified version of the dimmer voltage $V_{\phi\_DIM}$.

Capacitor 418 filters high frequency components from rectified dimmer voltage $V_{\phi\_R}$. Capacitors 418 and 420 establish a voltage divider to set a gate bias voltage $V_g$ for the source follower field effect transistor (FET) 422. Resistor 407 reduces peak currents through diode 426. In at least one embodiment, the particular capacitance values of capacitors 418 and 420 are a matter of design choice. In at least one embodiment, the capacitance of capacitor 418 is 22-47 nF, and the capacitance of capacitor 420 is 47 nF. Diode 424 prevents the gate current $i_g$ from being conducted to the voltage reference $V_{REF}$, such as a ground reference. The gate current $i_g$ is conducted through diode 426, which prevents reverse current flow of the gate current $i_g$, to the gate of source follower FET 422. Zener diode 428 clamps the gate of source follower FET 422 to the gate voltage $V_g$.

The gate bias voltage $V_g$ minus the source voltage $V_S$ of FET 422 exceeds a threshold voltage of FET 422. During start-up of power converter system 410, FET 422 conducts current $i_R$ through diode 430 to charge capacitor 432 to the operating voltage $V_{DD}$. In at least one embodiment, after start-up, an auxiliary power supply 434 provides an operational voltage $V_{DD}$ for controller 402. An exemplary auxiliary power supply 434 is described in U.S. patent application Ser. No. 13/077,421, filed on Mar. 31, 2011, entitled "Multiple Power Sources for a Switching Power Converter Controller", inventors John L. Melanson and Eric J. King, assignee Cirrus Logic, Inc. (referred to herein as "Melanson I"). Melanson I is hereby incorporated by reference in their entireties.

The capacitance of capacitor 432 is, for example, 10 μF. At start-up, the operating voltage $V_{DD}$ across capacitor 432 equals the Zener voltage $V_Z$ minus the threshold voltage $V_{T422}$ of FET 422 minus the diode voltage $V_d$ across diode 430, i.e. at start-up $V_{DD}=V_Z-V_{T422}-V_d$. FET 422 is a high voltage FET that is also used to control boost-type switching power converter 436, and the threshold voltage $V_{T422}$ of FET 422 is, for example, approximately 3V.

Figure 5:
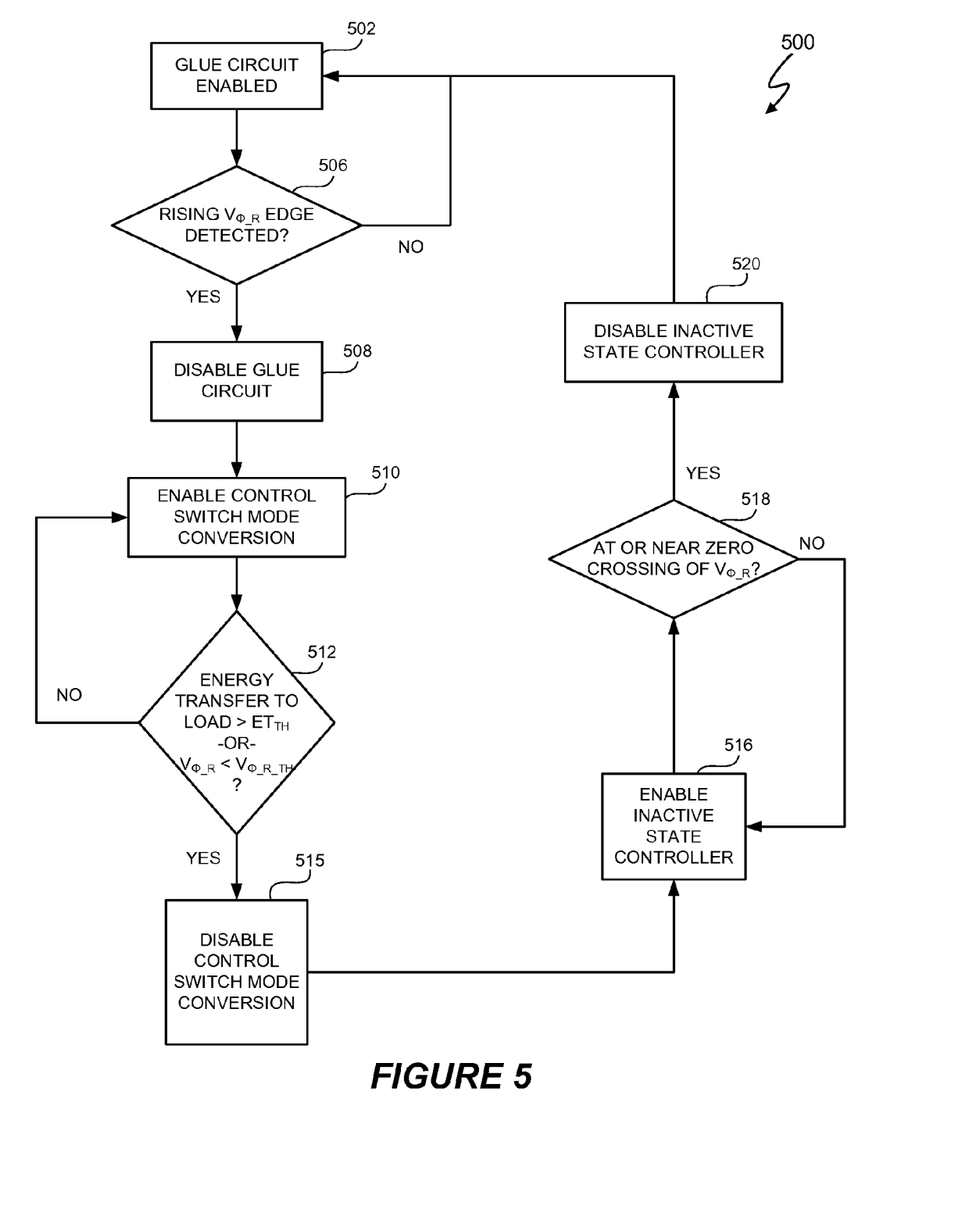
FIG. 5 depicts a controller function coordination process for the electronic system of FIG. 4.
Figure 6:
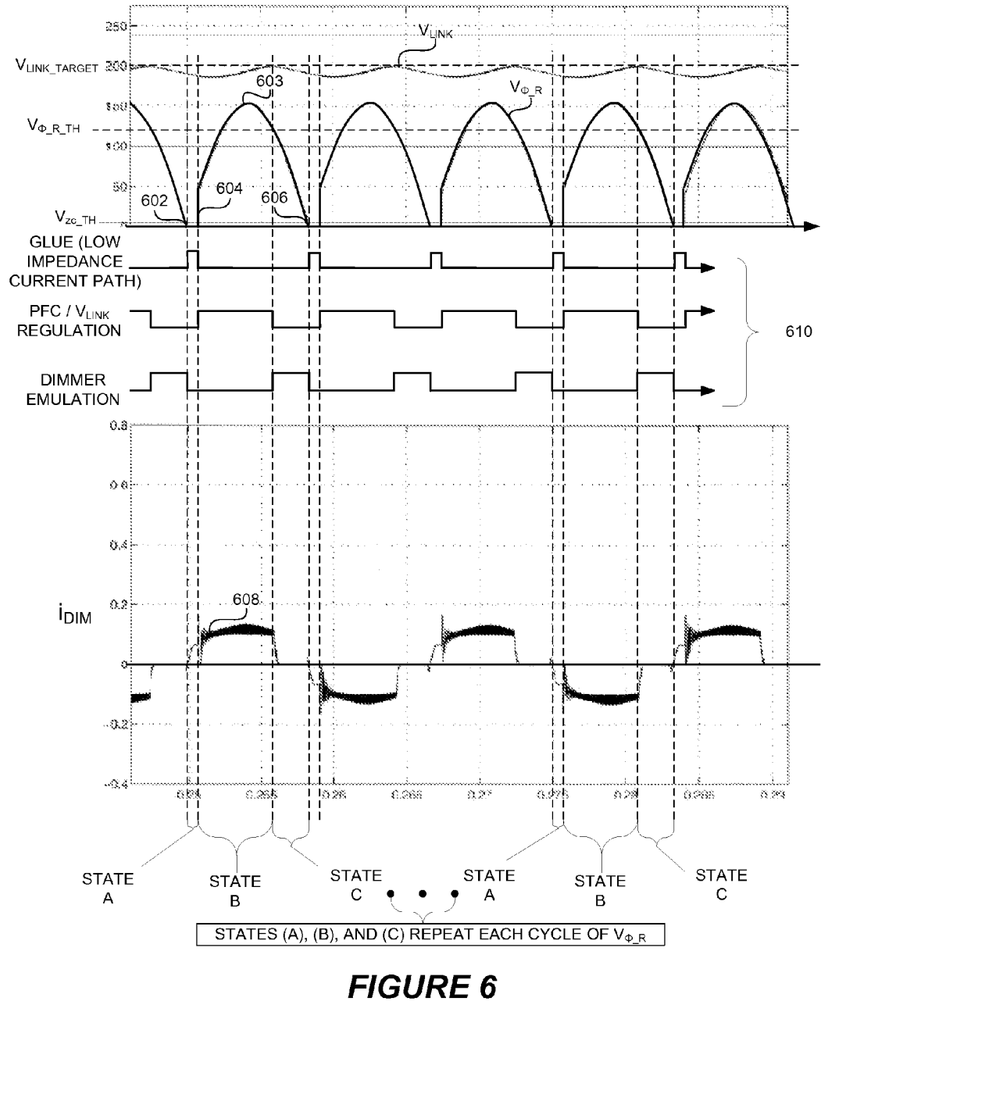
FIG. 6 depicts exemplary signals in the electronic system of FIG. 4 when utilizing the controller function coordination process of FIG. 5.

FIG. 5 depicts a controller function coordination process 500 that represents one embodiment of a process used by controller 402 (FIG. 4) to coordinate the functions of the low impedance path state controller 404, the switch mode power conversion controller 406, and the inactive state controller 408 and thereby provide compatibility between dimmer 414 and load 308. FIG. 6 depicts exemplary signals and states of the dimmer voltage $V_{\phi\_R}$ and dimmer current $i_{DIM}$ in the electronic system 400 when controller 402 utilizes the controller function coordination process 500. In at least one embodiment, controller 402 includes a memory (not shown) that includes code that implements one or more operations of controller function coordination process 500. In at least one embodiment, controller 402 also includes a processor (not shown) that is connected to the memory and executes the code and, thus, the operations of the controller function coordination process 500. In at least one embodiment, the controller function coordination process 500 is implemented using any combination of analog, digital, analog and digital, and/or microprocessor components. The particular implementation is a matter of design choice.

Referring to FIGS. 4, 5, and 6, in at least one embodiment, the controller function coordination process 500 initiates at the beginning of state A at an initial zero crossing of the dimmer voltage $V_{\phi\_R}$. In at least one embodiment, the controller 402 begins operation 502 at approximately each zero-crossing of the rectified dimmer voltage $V_{\phi\_R}$, such as within 0-5V of each zero crossing. Operation 502 enables low impedance path state controller 404. When the low impedance path state controller 404 is enabled, FET 422 conducts, and the drain-to-source impedance of FET 422 is very low, e.g. a few ohms Additionally, the frequency of the rectified input current $i_R$ is low so that the impedance of inductor 438 is low. Thus, the overall impedance of the low impedance path for current $i_{DIM}$ is a few ohms, such as between 0 and 100 ohms.

In at least one embodiment, for a new cycle of the rectified input voltage $V_{\phi\_R}$, operation 502 begins at the zero crossing 602, which is the beginning of state A. When operation 502 begins, the rectified input voltage $V_{\phi\_R}$ is less than the operating voltage $V_{DD}$ plus the forward bias voltage of diode 430. Thus, the diode 430 is reversed biased, and the source voltage $V_S$ at source node 407 is approximately equal to the rectified dimmer voltage $V_{\phi\_R}$ at node 444. The enabled low impedance path state controller 404 keeps the source voltage $V_S$ at approximately 0V and creates a low impedance current path 403 through inductor 438 and FET 422 for the rectified input current $i_R$ to flow. Thus, the supply current $i_{SUPPLY}$ is non-zero as indicated by the non-zero dimmer current $i_{DIM}$ during state A. Thus, the supply current $i_{SUPPLY}$ continues to flow to the dimmer 414 during operation 502 to, in at least one embodiment, stabilize the cycle-to-cycle phase cutting angle by dimmer 414 for a given dimming level.

While the low impedance path state controller 404 is enabled in operation 502, controller function coordination process 500 performs operation 506. Operation 506 determines whether the low impedance path state controller 404 has detected a leading edge, such as leading edge 604, of the rectified dimmer voltage $V_{\phi\_R}$. If a rising edge of the rectified input voltage $V_{\phi\_R}$ has not been detected, then the dimmer 414 is still phase cutting the supply voltage $V_{SUPPLY}$ and no voltage is available to boost the link voltage $V_{LINK}$. So, operation 502 continues to enable the low impedance path state controller 404. An exemplary system and method for detecting a phase cut including detecting the leading edges of the rectified dimmer voltage $V_{\phi\_R}$ is described in U.S. patent application Ser. No. 12/858,164, filed on Aug. 17, 2010, entitled Dimmer Output Emulation, inventor John L. Melanson, and assignee Cirrus Logic, Inc., which is referred to herein as "Melanson I" and incorporated by reference in its entirety. Another exemplary system and method for detecting the leading edges of the rectified dimmer voltage $V_{\phi\_R}$ is described in U.S. patent application Ser. No. 13/077,483, filed on Mar. 31, 2011, entitled Dimmer Detection, inventors Robert T. Grisamore, Firas S. Azrai, Mohit Sood, John L. Melanson, and Eric J. King and assignee Cirrus Logic, Inc., which is referred to herein as Grisamore I and also incorporated by reference in its entirety.

If a leading edge of the dimmer voltage $V_{\phi\_R}$ is detected, then operation 508 disables the low impedance path state controller 404. When the leading edge of the dimmer voltage $V_{\phi\_R}$ is detected, state A ends and state B begins. At the beginning of state B, operation 510 enables the switch mode power conversion controller 406. The switch mode power conversion controller 406 controls switching power converter 436 by generating the switch control signal CS to regulate the link voltage $V_{LINK}$ as, for example, described in U.S. patent application Ser. No. 12/496,457, filed on Jun. 30, 2009, entitled Cascode Configured Switching Using At Least One Low Breakdown Voltage Internal, Integrated Circuit Switch To Control At Least One High Breakdown Voltage External Switch, inventor John L. Melanson, and assignee Cirrus Logic, Inc., which is hereby incorporated by reference in its entirety. When switch mode power conversion controller 406 generates switch control signal CS to cause FET 422 to conduct, the input current $i_R$ energizes inductor 438 to increase the voltage across inductor 438. When switch mode power conversion controller 406 generates switch control signal CS to cause FET 422 to stop conducting, the input current $i_R$ boosts the voltage across the link voltage across link capacitor 440. Diode 442 prevents current flow from link capacitor 440 into inductor 438 or FET 422. During operation 510, the dimmer current $i_{DIM}$ is approximately constant as indicated, for example, by the dimmer current $i_{DIM}$ at 608.

While the switch mode power conversion controller 406 is enabled in operation 510, operation 512 determines if the energy transferred to the load 308 is greater than an energy transfer parameter $ET_{TH}$ or the dimmer voltage $V_{\phi\_R}$ is less than a dimmer threshold voltage $V_{\phi\_R\_TH}$. In at least one embodiment, operation 512 determines if the energy transferred from the dimmer 414 is greater than an energy transfer parameter $ET_{TH}$ by determining an amount of time since the beginning of state B. If the time exceeds a particular threshold, then the dimmer 414 has transferred a sufficient amount of energy to the power converter system 410. In at least one embodiment, the amount of time is sufficient to allow capacitor 121 (FIG. 1) to discharge so that the dimmer 414 operates consistently from cycle to cycle of dimmer voltage $V_{\phi\_R}$. An exemplary amount of time is 100-300 μsecs. In at least one embodiment, the energy parameter $ET_{TH}$ is a target link voltage $V_{LINK\_TARGET}$. In this embodiment, operation 512 determines if the energy transferred from the dimmer 414 is greater than an energy transfer parameter $ET_{TH}$ by determining if the link voltage $V_{LINK}$ is greater than the target link voltage $V_{LINK\_TARGET}$, then the link capacitor 440 has been sufficiently boosted. If the link voltage $V_{LINK}$ is not greater than the target link voltage $V_{LINK\_TARGET}$, the link voltage $V_{LINK}$ should be further boosted if the dimmer voltage $V_{\phi\_R}$ is greater than a rectified dimmer threshold voltage $V_{\phi\_R\_TH}$. In at least one embodiment, if the dimmer voltage $V_{\phi\_R}$ is less than a dimmer threshold voltage $V_{\phi\_R\_TH}$, the dimmer voltage $V_{\phi\_R}$ is too low to efficiently transfer energy to the load 308 from the voltage supply 412.

Thus, if sufficient energy has not been transferred to the load 308 or the rectified dimmer voltage $V_{\phi\_R}$ is greater than the rectified dimmer threshold voltage $V_{\phi\_R\_TH}$, then operation 510 continues to enable the switch mode power conversion controller 406 and, thus, continues to boost the link voltage $V_{LINK}$.

In operation 512, if sufficient energy has been transferred to the load 308 or the rectified dimmer voltage $V_{\phi\_R}$ is less than the rectified dimmer threshold voltage $V_{\phi\_R\_TH}$, then operation 515 causes the switch mode power conversion controller 406 to stop boosting the link voltage $V_{LINK}$, state B ends, state C begins, and operation 516 enables the inactive state controller 408. The "inactive" state controller 408 is not itself inactive. In at least one embodiment, the inactive state controller 408 causes the dimmer current $i_{DIM}$ to drop to approximately 0A and determines zero crossings and leading edges of the dimmer voltage $V_{\phi\_R}$.

The rectified dimmer current $i_R$ is inversely proportional to the rectified dimmer voltage $V_{\phi\_R}$. During state C when the inactive state controller 408 is enabled, the inactive state controller 408 controls the flow of the rectified dimmer current $i_R$ so that the voltage at node 444 emulates the actual rectified dimmer voltage $V_{\phi\_R}$ for a part of the cycle of the rectified dimmer voltage $V_{\phi\_R}$ that occurs when the link voltage $V_{LINK}$ is less than the target link voltage $V_{LINK\_TARGET}$ and after a detection of a leading edge of the rectified dimmer voltage $V_{\phi\_R}$. While the inactive state controller 408 emulates the rectified dimmer voltage $V_{\phi\_R}$, the inactive state controller 408 effectively isolates the power converter system 410 from the dimmer 414, and the emulated dimmer output voltage $V_{\phi\_R}$ allows the power converter system 410 and load 308 to function in a normal mode that is equivalent to when the dimmer 414 ideally continues to conduct until the supply voltage $V_{SUPPLY}$ reaches approximately 0V. An exemplary inactive state controller 408 is described in conjunction with FIG. 7 and in Melanson I.

Operation 518 determines whether the rectified input voltage $V_{\phi\_R}$ is at or near the next zero crossing, such as zero crossing 606. If the rectified input voltage $V_{\phi\_R}$ is not at or near the next zero crossing, the inactive state controller 408 continues to generate the emulated dimmer voltage $V_{\phi\_R}$. If the rectified input voltage $V_{\phi\_R}$ is at or near the next zero crossing, operation 520 disables the inactive state controller 408, and controller function coordination process 500 returns to operation 502 and repeats.

The enable/disable states 610 depict when the low impedance path state controller 404, switch mode power conversion controller 406, and inactive state controller 408 are enabled and disabled. A logical 1 indicates enabled, and a logical 0 indicated disabled. Thus, the enable/disable states 608 depict one embodiment of how the controller 402 can coordinate the functions of low impedance path state controller 404, inactive state controller 408, and switch mode power conversion controller 406.

Figure 7:
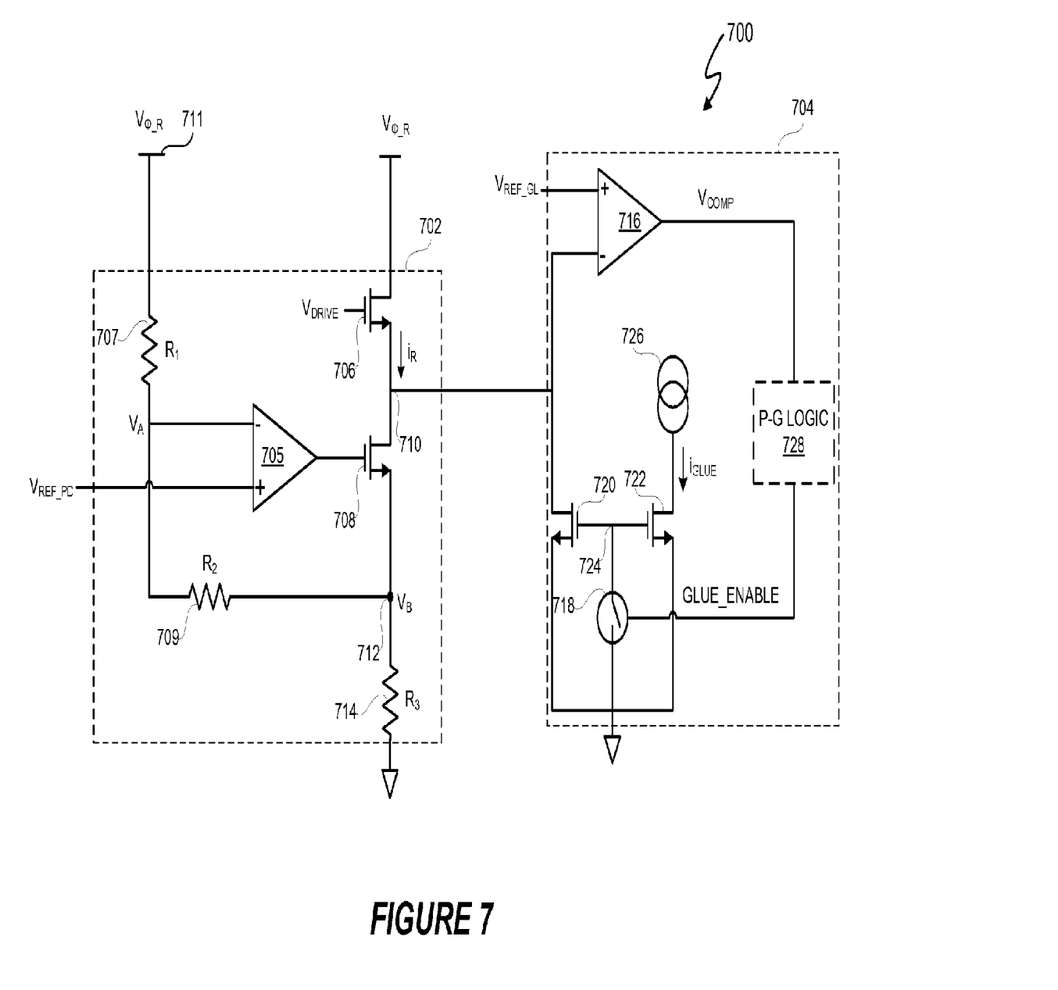
FIG. 7 depicts an embodiment of an inactive state controller of the electronic system of FIG. 4.

The inactive state controller 408 can be implemented as a digital, analog, or as an analog and digital circuit. FIG. 7 depicts an inactive state controller 700, which represents one embodiment of inactive state controller 408. Inactive state controller 700 functions in part as a current source that controls the current $i_R$. Inactive state controller 700 includes a pull-down circuit 702 to pull-down current $i_R$ after a triac of dimmer 414 turns OFF, and a hold or "glue" circuit 704 to hold the emulated dimmer output voltage $V_{\phi\_R}$ to approximately 0V until the triac 106 fires in a next half-cycle of dimmer voltage $V_{DIM}$.

Since, in at least one embodiment, the supply voltage $V_{SUPPLY}$ is a cosine wave, and the current $i_R$ is directly related to the derivative of the emulated dimmer output voltage $V_{\phi\_R}$, an ideal relationship between the current $i_R$ and the emulated dimmer output voltage $V_{\phi\_R}$ for a half cycle of supply voltage $V_{SUPPLY}$ is a quarter sine wave. However, a linearly decreasing relationship between current $i_R$ and emulated dimmer output voltage $V_{\phi\_R}$ is a close approximation of a quarter sine wave. The current $i_R$ versus emulated dimmer output voltage $V_{\phi\_R}$ causes the power converter system 410 to generate an oval emulated dimmer output voltage $V_{\phi\_R}$, which is a close approximation to a phase cut supply voltage $V_{SUPPLY}$.

In general, the pull-down circuit 702 creates the linearly decreasing relationship between current $i_R$ and emulated dimmer output voltage $V_{\phi\_R}$. The pull-down circuit 702 includes an operational amplifier 705 which includes a non-inverting input terminal "+" to receive a pull-down reference voltage $V_{REF\_PD}$. A feedback loop with voltage divider R1 and R2 between the emulated dimmer output voltage $V_{\phi\_R}$ terminal 711 and voltage $V_B$ at node 712 creates an inverse relationship between voltage $V_B$ and emulated dimmer output voltage $V_{\phi\_R}$. Thus, as the emulated dimmer output voltage $V_{\phi\_R}$ decreases, operational amplifier 705 drives the gate of n-channel metal oxide semiconductor field effect transistor (NMOSFET) 708 to increase the voltage $V_B$ so that the voltage $V_A$ at the inverting terminal "−" matches the reference voltage $V_{REF\_PD}$ at the non-inverting terminal "+". Similarly, as the emulated dimmer output voltage $V_{\phi\_R}$ increases, operational amplifier 705 drives the gate of n-channel metal oxide semiconductor field effect transistor (NMOSFET) 708 to decrease the voltage $V_B$ so that the voltage $V_A$ at the inverting terminal "−" continues to match the reference voltage $V_{REF\_PD}$ at the non-inverting terminal "+".

The voltage $V_{DRIVE}$ at the gate of NMOSFET 706 maintains NMOSFET 706 in saturation mode. In at least one embodiment, voltage $V_{DRIVE}$ is +12V. The voltage $V_B$ across resistor 714 determines the value of current $i_R$, i.e. $i_R=V_B/R3$, and "R3" is the resistance value of resistor 714. Thus, current $i_R$ varies directly with voltage $V_B$ and, thus, varies inversely with emulated dimmer output voltage $V_{\phi\_R}$. From the topology of pull-down circuit 702, voltage $V_B$ is related to the reference voltage $V_{REF\_PD}$ in accordance with Equation [Error! Bookmark not defined.]:

$$V_B = V_{REF\_PD} \cdot \frac{R1 + R2}{R1} - \frac{R2 \cdot V_{\Phi\_R}}{R1}$$

[Error! Bookmark not defined.]

R1 is the resistance value of resistor 707, and R2 is the resistance value of resistor 709. If R1>>R2, then the voltage $V_B$ is represented by Equation
[Error! Bookmark not defined.]

$$V_B \approx V_{REF\_PD} - \frac{R2 \cdot V_{\Phi\_R}}{R1}$$

[Error! Bookmark not defined.]

Since $i_R=V_B/R3$, if R1 is 10 Mohms, R2 is 42 kohms, and R3 is 1 kohm, in accordance with Equation [Error! Bookmark not defined.], $i_R$ is represented by Equation
[Error! Bookmark not defined.]:

$$i_R \approx 0.8\left(1 - \frac{V_{\Phi\_R}}{190}\right) mA$$

[Error! Bookmark not defined.]

Once the pull-down circuit 702 lowers the emulated dimmer output voltage $V_{\phi\_R}$ to a glue down reference voltage $V_{REF\_GL}$, the glue-down circuit 704 holds the emulated dimmer output voltage $V_{\phi\_R}$ at or below a threshold voltage, such as approximately 0V, until the triac 106 fires and raises the emulated dimmer output voltage $V_{\phi\_R}$. The glue-down reference voltage $V_{REF\_GL}$ represents one embodiment of the zero crossing voltage threshold $V_{ZC\_TH}$ discussed in conjunction with FIG. 3. Comparator 716 of glue-down circuit 704 compares the emulated dimmer output voltage $V_{\phi\_R}$ with the glue-down reference voltage $V_{REF\_GL}$. The particular value of the glue-down reference voltage $V_{REF\_GL}$ is a matter of design choice. In at least one embodiment, voltage $V_{REF\_GL}$ is set so that the glue-down circuit 704 holds the voltage $V_{\phi\_R}$ to approximately 0V when the voltage $V_{\phi\_R}$ approaches 0V. In at least one embodiment, the glue-down reference voltage $V_{REF\_GL}$ is set to 5V. Since NMOSFET 706 operates in saturation mode, the voltage at node 710 is approximately equal to emulated dimmer output voltage $V_{\phi\_R}$. When emulated dimmer output voltage $V_{\phi\_R}$ is greater than the glue-down reference voltage $V_{REF\_GL}$, the output voltage $V_{COMP}$ of comparator 716 is a logical 0. In at least one embodiment, the comparator output voltage $V_{COMP}$ is passed directly as signal GLUE_ENABLE to a control terminal of switch 718. Switch 718 can be any type of switch and is, for example, an NMOSFET. When the comparator output voltage $V_{COMP}$ is a logical 0, switch 718 is OFF, and NMOSFETs 720 and 722 are also OFF. A transition of the comparator output voltage $V_{COMP}$ from a logical 1 to a logical 0 indicates a determined zero crossing of the dimmer voltage $V_{\phi\_R}$, which is used by operation 518 of controller function coordination process 500 (FIG. 5).

When emulated dimmer output voltage $V_{\phi\_R}$ transitions from greater than to less than the glue-down reference voltage $V_{REF\_GL}$, the comparator output voltage $V_{COMP}$ changes from a logical 0 to a logical 1. A transition of the comparator output voltage $V_{COMP}$ from a logical 0 to a logical 1 indicates a determined leading edge of the dimmer voltage $V_{\phi\_R}$, which is used by operation 506 of controller function coordination process 500 (FIG. 5). When the comparator output voltage $V_{COMP}$ is a logical 1, NMOSFETs 720 and 722 conduct. NMOSFETs 720 and 722 are configured as a current mirror sharing a common gate terminal 724. A current source 726 generates a glue current $i_{GLUE}$, which is mirrored through NMOSFET 720. In at least one embodiment, when emulated dimmer output voltage $V_{\phi\_R}$ is less than glue-down reference voltage $V_{REF\_GL}$, current $i_R$ is approximately equal to the glue current $i_{GLUE}$. In at least one embodiment, the glue current $i_{GLUE}$ is set to a value large enough to hold the emulated dimmer output voltage $V_{\phi\_R}$ at approximately 0V until a triac of the dimmer 414 fires again. In at least one embodiment, the glue current $i_{GLUE}$ is at least as large as a holding current value HC of dimmer 414 (FIG. 4), such as 250 mA. Thus, the glue circuit 704 draws a steady state glue current $i_{GLUE}$ from the power converter system 410 to maintain the emulated dimmer output voltage $V_{\phi\_R}$ at or below a threshold voltage, such as approximately 0V, during a period of time from when the pull-down circuit 702 lowers the emulated dimmer output voltage $V_{\phi\_R}$ to the glue down reference voltage $V_{REF\_GL}$ until the triac 106 fires and raises the emulated dimmer output voltage $V_{\phi\_R}$.

In at least one embodiment, the glue circuit 704 also includes pull-down, glue logic ("P-G logic") 728. The P-G logic 728 generates the signal GLUE_ENABLE to control conductivity of switch 718. The particular function(s) of P-G logic 728 are a matter of design choice. For example, in at least one embodiment, P-G logic 728 enables and disables the glue-down circuit 704. In at least one embodiment, to enable and disable the glue-down circuit 704, P-G logic 728 determines whether the dimmer output voltage $V_{\phi\_DIM}$ contains any phase cuts as, for example, described in Grisamore I. If the dimmer output voltage $V_{\phi\_DIM}$ does not indicate any phase cuts, then the P-G logic 728 disables the glue down circuit 704 by generating the GLUE_ENABLE signal so that switch 718 does not conduct regardless of the value of comparator output voltage $V_{COMP}$. In at least one embodiment, P-G logic 728 includes a timer (not shown) that determines how often the comparator output voltage $V_{COMP}$ changes logical state. If the time between logical state changes is consistent with no phase cuts, P-G logic 728 disables the glue-down circuit 704. Additional, exemplary discussion of the inactive state controller 700 is described in Melanson I. The particular system and method of determining a zero crossing of the dimmer voltage $V_{\phi\_R}$ is a matter of design choice. U.S. provisional patent application No. 61/410,269 describes another exemplary system and method for determining a zero crossing of the dimmer voltage $V_{\phi\_R}$. U.S. provisional patent application No. 61/410,269, filed on Nov. 4, 2010, entitled "Digital Resynthesis of Input Signal Dimmer Compatibility", inventors John L. Melanson and Eric J. King, attorney docket no. 1883-EXL, is hereby incorporated by reference in its entirety.

Thus, an electronic system includes a controller that coordinates the functions of a glue circuit, a dimmer emulator, and a switch mode power conversion controller to provide compatibility between a dimmer and a load.

Although embodiments have been described in detail, it should be understood that various changes, substitutions, and alterations can be made hereto without departing from the spirit and scope of the invention as defined by the appended claims.

What is claimed is:

1. An apparatus, wherein a dimmer voltage to a power converter system comprises three states for multiple cycles of the dimmer voltage that occur from:
   (A) an approximately zero volt crossing of the dimmer voltage of the dimmer until a phase cut, leading edge of the dimmer voltage;
   (B) an end of state A until energy transferred to a load is sufficient to meet at least one energy transfer parameter; and
   (C) an end of state B until a beginning of state A in a next cycle of the dimmer voltage,
   the apparatus comprising:
       a load;
       a controller configured to:
           for state A, enable a low impedance path for a dimmer current of the dimmer, wherein an impedance of the low impedance path is sufficiently low to maintain a stable phase angle of the dimmer;
           for state B,
               generating a control signal to enable control of switch mode power conversion of the dimmer voltage; and
               control the switch mode power conversion to maintain the dimmer current above a current threshold; and
           for state C, enter an inactive state, wherein during the inactive state the low impedance path and the control of mode power conversion is disabled; and
       a switching power converter, coupled to the controller and the load, configured to receive the control signal, the dimmer voltage, and the dimmer current to convert the dimmer voltage and dimmer current into energy for the load in response to the control signal.

2. The apparatus of claim 1 wherein the at least one energy transfer parameter comprises a link voltage threshold value, to determine when the energy transferred to a load is sufficient to meet an energy transfer parameter the controller is further configured to at least:
   determine when a link voltage is less than the link voltage threshold value, wherein sufficient energy is transferred to the load when the link voltage is less than the link voltage threshold value.

3. The apparatus of claim 1 wherein state B further comprises an end of state A until energy transferred to a load is sufficient to meet at least a first energy transfer parameter and until energy transferred from the dimmer is sufficient to meet at least a second energy transfer parameter.

4. The apparatus of claim 1 wherein the second energy transfer parameter is an amount of time during which the dimmer is conducting a supply voltage.

5. The apparatus of claim 1 wherein the controller is configured to:
   enable control of mode power conversion of the dimmer voltage;
   determine when a link voltage of a switching power converter is greater than a link voltage threshold value;
   determine when the dimmer voltage is less than a dimmer voltage threshold value;
   disable switch mode power conversion when the link voltage is greater than the link voltage threshold value and the dimmer voltage is less than the dimmer voltage threshold value; and
   enter the inactive state after disablement of the switch mode power conversion.

6. The apparatus of claim 1 wherein the controller is configured to:
   enter the inactive state;
   determine when the dimmer voltage corresponds to the approximately zero volt crossing of the dimmer voltage; and
   enable the low impedance path for the dimmer current when the dimmer voltage corresponds to the approximately zero crossing of the dimmer voltage.

7. The apparatus of claim 1 wherein the controller is configured to:
   (a) enable the low impedance path for the dimmer current;
   (b) determine when a link voltage is less than a first link voltage threshold value;
   (c) determine occurrences of the phase cut, leading edge of the dimmer voltage;
   (d) disable the low impedance path for the dimmer current when the link voltage is below the link threshold voltage value and the phase cut, leading edge of the dimmer voltage is determined;
   (e) enable control of mode power conversion of the dimmer voltage;
   (f) determine when a link voltage of a switching power converter is greater than a link voltage threshold value;
   (g) determine when the dimmer voltage is less than a dimmer voltage threshold value;
   (h) disable switch mode power conversion when the link voltage is greater than the link voltage threshold value and the dimmer voltage is less than the dimmer voltage threshold value;
   (i) enter the inactive state after disablement of the switch mode power conversion;
   (j) determine when the dimmer voltage corresponds to the approximately zero volt crossing of the dimmer voltage; and
   (k) enable the low impedance path for the dimmer current when the dimmer voltage corresponds to the approximately zero crossing of the dimmer voltage; and repeat b through k for each cycle of the dimmer voltage, wherein the dimmer voltage is rectified.

8. The apparatus of claim 1 wherein the load comprises one or more light emitting diodes.

9. The apparatus of claim 1:
   wherein the controller includes a dimmer voltage emulator, and the dimmer output emulator is configured to cause a power converter system to generate an emulated dimmer voltage, wherein the emulated dimmer voltage emulates part of a cycle of the dimmer voltage.

10. A method wherein a dimmer voltage to a power converter system comprises three states for multiple cycles of the dimmer voltage that occur from:
   (A) an approximately zero volt crossing of the dimmer voltage of a dimmer until a phase cut, leading edge of the dimmer voltage;
   (B) an end of state A until energy transferred to a load is sufficient to meet at least one energy transfer parameter; and
   (C) an end of state B until a beginning of state A in a next cycle of the dimmer voltage;

the method comprising:
  for state A, enabling a low impedance path for a dimmer current of the dimmer, wherein an impedance of the low impedance path is sufficiently low to maintain a stable phase angle of the dimmer;
  for state B:
    generating a control signal to enable control of switch mode power conversion of the dimmer voltage; and
    controlling switch mode power conversion to maintain the dimmer current above a threshold; and
  for state C, entering an inactive state, wherein during the inactive state the low impedance path and the control of mode power conversion is disabled;
  receiving the control signal, the dimmer voltage, and the dimmer current with a switching power converter; and
  converting the dimmer voltage and dimmer current into energy for the load in response to the control signal.

11. The method of claim 10 wherein the at least one energy transfer parameter comprises a link voltage threshold value, the method further comprising:
  determining when a link voltage is less than the link voltage threshold value, wherein sufficient energy is transferred to the load when the link voltage is less than the link voltage threshold value.

12. The method of claim 10 wherein state B further comprises an end of state A until energy transferred to a load is sufficient to meet at least a first energy transfer parameter and until energy transferred from the dimmer is sufficient to meet at least a second energy transfer parameter.

13. The method of claim 10 wherein the second energy transfer parameter is an amount of time during which the dimmer is conducting a supply voltage.

14. The method of claim 10 further comprising:
  enabling control of mode power conversion of the dimmer voltage;
  determining when a link voltage of a switching power converter is greater than a link voltage threshold value;
  determining when the dimmer voltage is less than a dimmer voltage threshold value;
  disabling switch mode power conversion when the link voltage is greater than the link voltage threshold value and the dimmer voltage is less than the dimmer voltage threshold value; and
  entering the inactive state after disabling of the switch mode power conversion.

15. The method of claim 10 further comprising:
  entering the inactive state;
  determining when the dimmer voltage corresponds to the approximately zero volt crossing of the dimmer voltage; and
  enabling the low impedance path for the dimmer current when the dimmer voltage corresponds to the approximately zero crossing of the dimmer voltage.

16. The method of claim 10 further comprising:
  (a) enabling the low impedance path for the dimmer current;
  (b) determining when a link voltage is less than a first link voltage threshold value;
  (c) determining occurrences of the phase cut, leading edge of the dimmer voltage;
  (d) disabling the low impedance path for the dimmer current when the link voltage is below the link threshold voltage value and the phase cut, leading edge of the dimmer voltage is determined;
  (e) enabling control of mode power conversion of the dimmer voltage;
  (f) determining when a link voltage of a switching power converter is greater than a link voltage threshold value;
  (g) determining when the dimmer voltage is less than a dimmer voltage threshold value;
  (h) disabling switch mode power conversion when the link voltage is greater than the link voltage threshold value and the dimmer voltage is less than the dimmer voltage threshold value;
  (i) entering the inactive state after disablement of the switch mode power conversion;
  (j) determining when the dimmer voltage corresponds to the approximately zero volt crossing of the dimmer voltage;
  (k) enabling the low impedance path for the dimmer current when the dimmer voltage corresponds to the approximately zero crossing of the dimmer voltage; and
  repeating b through k for multiple cycles of the dimmer voltage, wherein the dimmer voltage is rectified.

17. The method of claim 10 wherein the load comprises one or more light emitting diodes.

18. The method of claim 10 further comprising:
  determining the zero volt crossing of the dimmer voltage by causing a power converter system to generate an emulated dimmer voltage, wherein the emulated dimmer voltage emulates part of a cycle of the dimmer voltage.

19. The method of claim 10 wherein the current threshold is sufficient to prevent the dimmer from prematurely resetting.

20. An apparatus wherein a dimmer voltage to a power converter system comprises three states for multiple cycles of the dimmer voltage that occur from:
  (A) an approximately zero volt crossing of the dimmer voltage of a dimmer until a phase cut, leading edge of the dimmer voltage;
  (B) an end of state A until energy transferred to a load is sufficient to meet at least one energy transfer parameter; and
  (C) an end of state B until a beginning of state A in a next cycle of the dimmer voltage;
the apparatus comprising:
  a load comprising one or more light emitting diodes;
  for state A, means for enabling a low impedance path for a dimmer current of the dimmer, wherein an impedance of the low impedance path is sufficiently low to maintain a stable phase angle of the dimmer;
  for state B:
    means for enabling control of switch mode power conversion of the dimmer voltage; and
    means for controlling switch mode power conversion to maintain the dimmer current above a threshold; and
  for state C, means for entering an inactive state, wherein during the inactive state the low impedance path and the control of mode power conversion is disabled; and
  means, coupled to the controller and the load, for receiving the control signal, the dimmer voltage, and the dimmer current and for converting the dimmer voltage and dimmer current into energy for the load in response to the control signal.

* * * * *